United States Patent [19]

Blaimschein

[11] Patent Number: 5,372,357
[45] Date of Patent: Dec. 13, 1994

[54] WORK-SUPPORTING DECK FOR USE IN MACHINE TOOLS, PARTICULARLY IN CUTTING MACHINES

[75] Inventor: Gottfried Blaimschein, Steyr, Austria

[73] Assignee: GFM Gesellschaft für Fertigungstechnik und Maschinenbau Aktiengesellschaft, Steyr, Austria

[21] Appl. No.: 81,513

[22] Filed: Jun. 15, 1993

Related U.S. Application Data

[63] Continuation-in-part of Ser. No. 855,209, Mar. 20, 1992, abandoned.

[30] Foreign Application Priority Data

Mar. 26, 1991 [EP] European Pat. Off. ......... 91890059.8

[51] Int. Cl.⁵ .................................................. B25B 11/00
[52] U.S. Cl. ........................................ 269/21; 269/266
[58] Field of Search ................ 269/21, 71, 76, 75, 269/266; 279/3; 294/64 R; 51/235

[56] References Cited

U.S. PATENT DOCUMENTS

| | | |
|---|---|---|
| 2,729,040 | 1/1956 | Wallace et al. . |
| 3,108,791 | 10/1963 | Budney et al. . |
| 3,821,867 | 7/1974 | Hunkeler et al. . |
| 3,838,865 | 10/1974 | Roberts et al. .................... 269/21 |
| 3,969,004 | 7/1976 | Schliemann ........................ 269/21 |
| 4,034,517 | 7/1977 | Weatherell et al. . |
| 4,066,249 | 1/1978 | Huber et al. . |
| 4,075,753 | 2/1978 | Gusching et al. ................... 269/56 |
| 4,088,312 | 5/1978 | Frosch et al. ...................... 269/266 |
| 4,200,271 | 4/1980 | August et al. . |
| 4,200,272 | 4/1980 | Godding ............................ 269/266 |
| 4,491,306 | 1/1985 | Eickhorst ........................... 269/21 |
| 4,684,113 | 8/1987 | Douglas et al. . |
| 4,723,766 | 2/1988 | Beeding . |
| 4,924,258 | 5/1990 | Tsutsui ............................... 269/21 |
| 4,946,149 | 8/1990 | Greene ............................... 269/21 |

FOREIGN PATENT DOCUMENTS

| | | |
|---|---|---|
| 0069230 | 7/1987 | European Pat. Off. . |
| 62-130144 | 6/1987 | Japan ................................. 269/21 |
| 2205258 | 12/1988 | United Kingdom ................ 269/21 |

Primary Examiner—Robert C. Watson
Attorney, Agent, or Firm—Collard & Roe

[57] ABSTRACT

A work-supporting deck for use in machine tools for processing flat material comprises vacuum aspirators, which serve to support and retain a workpiece and carry suction cups, which are adjustable in height by actuators.

To provide economical means for reliably retaining the workpieces substantially independently of its shape and size, a multiplicity of vacuum aspirators are provided, which are arranged in rows and columns and are connected each to an individually operable actuator for moving the suction cup between an inactive lower position and an active upper position.

20 Claims, 5 Drawing Sheets

WORK-SUPPORTING DECK FOR USE IN MACHINE TOOLS, PARTICULARLY IN CUTTING MACHINES

This is a continuation-in-part of copending application(s) Ser. No. 07/855,209 filed on Mar. 20, 1992, now abandoned.

BACKGROUND OF THE INVENTION

1. Field of the Invention

This invention relates to a work-supporting deck for use in machine tools, particularly in cutting machines for cutting flat stock, which deck comprises vacuum aspirators, which serve to support and retain a workpiece and carry suction cups, which are adjustable in height by actuators.

2. Description of the Prior Art

Work-supporting decks having a work-supporting surface, at which a vacuum can be applied, have proved satisfactory for use in the processing of flat stock, such as the trimming or contour milling of metal plates and parts of wood, and particularly of monolayer plastic blanks or multilayer plastic blanks (composites), because the two-dimensional workpieces can reliably be retained on the work-supporting surface by the applied vacuum substantially independently of their geometric configuration. But in order to avoid damage to such so-called vacuum decks, they must be provided with cover plates which support the workpieces and consist of an air-permeable material or of contour templates provided with suitable gaskets. But contour templates involve a substantial expenditure and must conform to specific workpieces so that their use is restricted. The porous cover plates of foamed plastic also cannot be satisfactory because furrows will be cut into the cover plate as it is penetrated by the tool during its processing operation and such furrows will adversely effect the application and action of the vacuum which is required for this reason it is necessary to use a tool which laterally protrudes over the workpiece only to the smallest possible extent and to cover the workpiece at its edges with plastic films so that the utilization of the tool is decreased and the films must be handled in a complicated manner.

In EP-A-0069 230 it has already been suggested to provide a work-supporting deck with several vacuum aspirators and to support the workpieces only by the suction cups of said aspirators rather than on a continuous work-supporting surface. But the workpiece cannot be retained as desired by the known vacuum aspirators unless they engage the workpiece at predetermined points so that each aspirator must individually be laterally adjusted and the work-supporting decks provided with said aspirators can be used only to support workpieces having a predetermined shape. Besides, the workpiece is supported only at a few points so that the processing of the workpiece gives rise to vibration, which often preclude the use of mechanical means for additionally fixing the workpiece.

SUMMARY OF THE INVENTION

For this reason it is an object of the invention to eliminate these disadvantages and to provide a work-supporting deck which is of the kind described first hereinbefore and which ensures an effective retaining of work-pieces regardless of their shape and also establishes optimum conditions for a processing with a desired quality and for a full utilization of the tools.

That object is accomplished in accordance with the invention in that a multiplicity of vacuum aspirators are provided, which are arranged in rows and columns and are connected each to an individually operable actuator for moving the suction cup between an inactive lower position and an active upper position. Because the work-supporting surface is constituted by a multiplicity of aspirators, which are arranged in rows and columns, the workpiece will effectively be supported by said aspirators throughout its surface rather than only at discrete points so that the workpiece will reliably be retained as desired. Because each suction cup can independently be raised, the elevations of the points at which the workpiece is supported can be adapted to workpieces of any shape because it will be sufficient to raise and activate in accordance with a suitable control program only those of the existing suction cups which are disposed within the contour of a given workpiece so that any given workpiece regardless of its geometric configuration will snugly rest on the suction cups and will be retained by the raised suction cups whereas a marginal portion of the workpiece will be left free for being processed. Any suction cup which partly underlies and partly protrudes laterally from the workpiece will not be raised and activated so that the processing tools can operate satisfactorily and can be optimally utilized. The application of the vacuum to the workpiece will not be adversely affected by the operation of the tool. The provision of a multiplicity of aspirators precludes an exciting of a vibration of the workpiece by the processing and ensures that the workpiece will satisfactorily be retained without a need for additional means, such as intermediate plates and covering films.

If the aspirators are arranged in groups which differ in pitch, it will be possible to provide different work-supporting regions for supporting different workpieces. For instance, relatively small workpieces may be supported in regions in which the aspirators are more closely spaced apart, and aspirators may be arranged in specially designed arrays for retaining certain workpieces.

The work-supporting surface of the work-supporting deck is desirably divided into at least two sections and the aspirators in each of said sections may be connected to a common vacuum source. Such sections can then be used for per supporting the workpieces for a performance of different operations. For instance, a workpiece may be processed while it is supported in one section and a different workpiece may be applied to or removed from the other section at the same time. Because the suction cups of each section are connected to a common vacuum source it will be sufficient to apply a vacuum only to the suction cups of that section on which a workpiece is to be retained at a time so that the economy of the operation will be improved. It will be understood that aspirators of the two sections may be connected in alternation to one and the same vacuum source if it is sufficient to apply a vacuum only to one of said sections at a time.

According to a further feature of the invention, each suction cup is vertically movable to different active positions within a predetermined elevation range and the actuators for raising and lowering the suction cups are preferably operable in two power stages. Even uneven work-pieces can satisfactorily be supported by the suction cups in that elevation range because the elevations of the suction cups can be adapted to the shape of the bottom surface of the workpiece. When it is desired to retain a workpiece, only those aspirators which are to engage the workpiece close to its edges are initially raised by a normal power so that said aspirators can perform their normal supporting function and the aspirators for engaging the workpiece in an inner region are then raised with a lower power into engagement with the workpiece to retain the latter. To ensure that the retaining of the workpiece will not adversely be effected by the subsequent engagement of the inner aspirators, said inner aspirators are raised by a force which is smaller than the supporting force exerted by the marginal aspirators so that the desired support will be ensured even if the workpiece has a curved surface.

In a desirable design, each aspirator comprises a lifting ram, which is formed with an axial suction bore and which at its top carries the suction cup, and said lifting ram is operatively connected to an actuator and is vertically slidably fitted in a bushing, which is contained in a vacuum chamber. The lifting ram is formed with a transverse port bore, which is adapted to communicate with a transverse bore of the bushing as in a sliding valve. Such a lifting ram can be adjusted in a simple manner by the associated actuator, which preferably consists of a piston-cylinder unit, and by its displacement does not only impart to the suction cup the desired adjustment in height but also connects the suction cup to the vacuum chamber, to which a vacuum is constantly applied. As soon as the lifting ram has been raised to a position in which the port bore communicates with the transverse bore of the bushing, the suction bore with the vacuum chamber and the vacuum maintained in the vacuum chamber is applied by the suction cup to the workpiece.

If the transverse bore merges on the inside surface of the bushing into a wider annular groove, that groove will define an elevation range within which the active position of the suction cup can be selected because the port bore of the lifting ram will communicate with the vacuum chamber when the suction cup is in any position within that elevation range. In that case the elevation of the suction cup can automatically be adjusted in adaptation to a curved underside surface of the workpiece as the suction cup is raised.

According to a particularly preferred feature of the invention the suction cup is eccentrically disposed on the lifting ram, which is rotatably mounted in the bushing, so that the pitch of the suction cups can intentionally be altered by a rotation of the lifting ram and the positions of the suction cups can be adjusted in adaptation to the contour of a given workpiece.

The bushing may comprise two cam sleeves having confronting end faces, which define a cam groove and constitute cam faces for cooperating with a cam follower pin, which extends into said cam groove and is connected to the lifting ram. In that case the cooperation of the cam follower pin and the cam faces will have the result that a vertical movement of the lifting ram will effect a rotation of the lifting ram and of the suction cup so that the actuators can be controlled to determine the rotational positions of the suction cups and the desired pitch will automatically be obtained. The cam faces may have various shapes and, for instance, may have the configuration of sawtooth lines which are offset from each other so that the lifting ram will be rotated in steps as it is raised and lowered. Alternatively, said cam faces may be stepped in height to define certain elevations of the lifting rams so that the elevations of the suction cups can be adjusted in adaptation to the shape of the bottom surface of a given workpiece.

In a relatively simple arrangement, a common vacuum chamber is associated with a plurality of aspirators. In that case the number of vacuum lines required for the connection to a vacuum source will be reduced and the application of a uniform vacuum will be ensured in a simple manner.

The adaptation of the aspirators to different workpieces can also be improved in that the aspirators are mounted in the frame of the deck so as to be laterally adjustable. For that purpose each aspirator may be individually adjustable or a row of aspirators may be adjustable in unison by a displacement of a commonly associated, slidably mounted vacuum chamber structure. By such an adjustment the work-supporting deck can be adjusted in adaptation to various processing programs, workpieces shapes and workpiece sizes.

DETAILED DESCRIPTION OF THE PREFERRED EMBODIMENT

Figure 1:
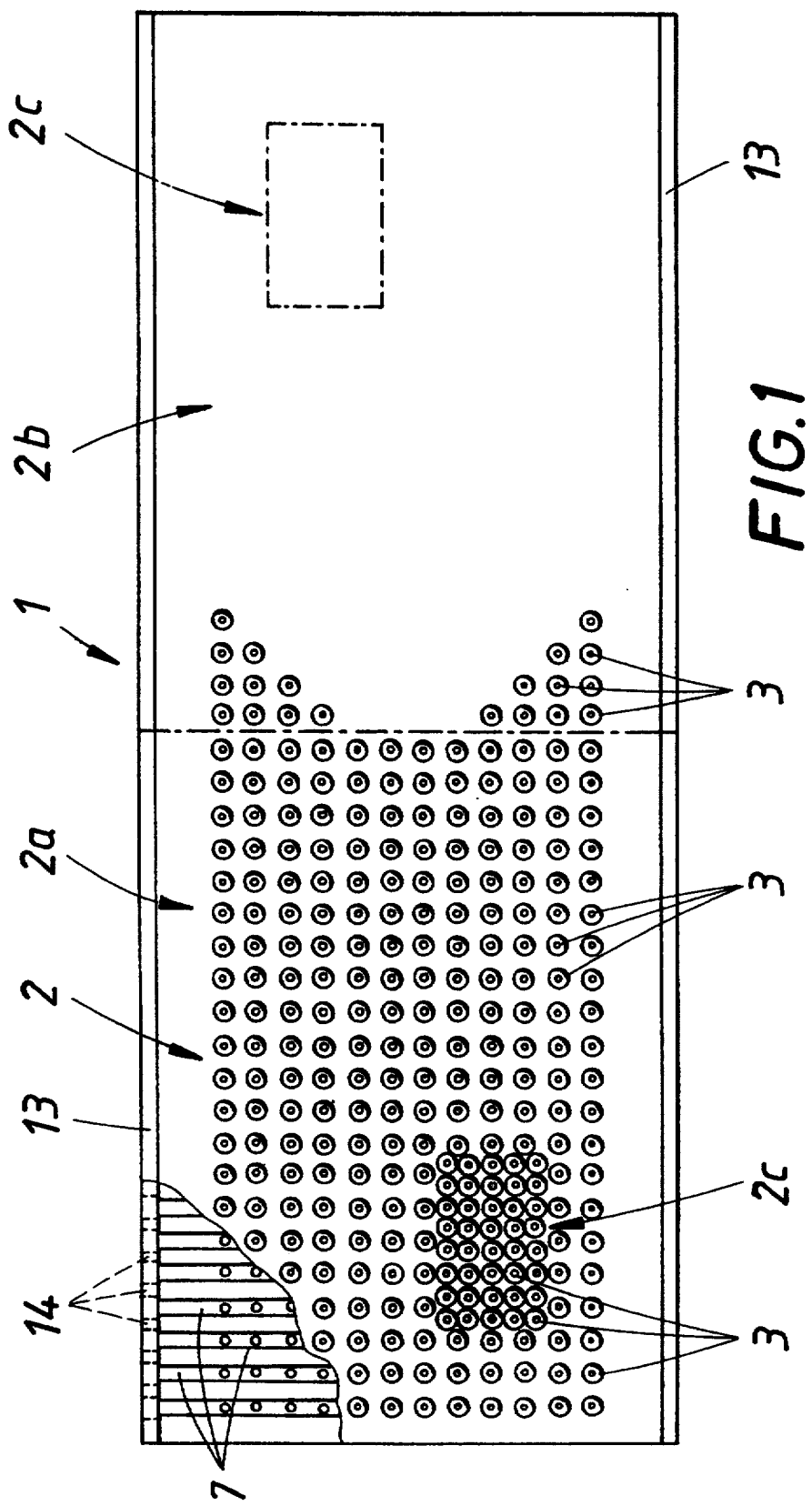
FIG. 1 is a schematic top plan view showing a work-supporting table in accordance with the invention.

Embodiments of the invention will now be described by way of example with reference to the drawing.

Flat stock to be processed, e.g., to be machined at its edges by contour milling, should reliably be retained in position regardless of its shape and size. For that purpose a work-supporting deck 1 is provided, which has a work-supporting surface 2 that is constituted by a multiplicity of vacuum aspirators 3, which are arranged in rows and columns. Each of said vacuum aspirators 3 comprises a vacuum cup 4, which is adapted to be raised and lowered by means of an individually operable actuator consisting of a piston-cylinder unit 5 between a lower inactive position, in which no vacuum is applied, and an active upper position, in which a vacuum is applied. For that purpose each vacuum aspirator 3 comprises a lifting ram 6, which at its top carries the suction cup 4 and is connected to the actuator 5 and is vertically slidably fitted in a bushing 8, which extends in a vacuum chamber 7. The lifting ram 6 is formed with an axial suction bore 9 and with a transverse port bore 10, which opens into the axial bore 9. The bushing 8 is formed with a transverse bore 11, which is adapted to register with the port bore 10 so that the suction bore 9 will communicate with the vacuum chamber 7 via the port bore 10 and the transverse bore 11 or will be shut off from the vacuum chamber 7 in dependence on the elevation of the lifting ram 6. The position of the port bore 10 in the lifting ram 6 and the position of the transverse bore 11 in the bushing 8 will be so selected that the lifting ram 6 can be raised to an active position, in which a vacuum is applied to the suction cup 4 from the vacuum chamber 7, whereas the vacuum cup will be exposed to atmospheric pressure when the lifting ram 6 has been lowered to an inactive lower position, in which the port bore 10 is disposed outside of the vacuum chamber 7.

Figure 2:
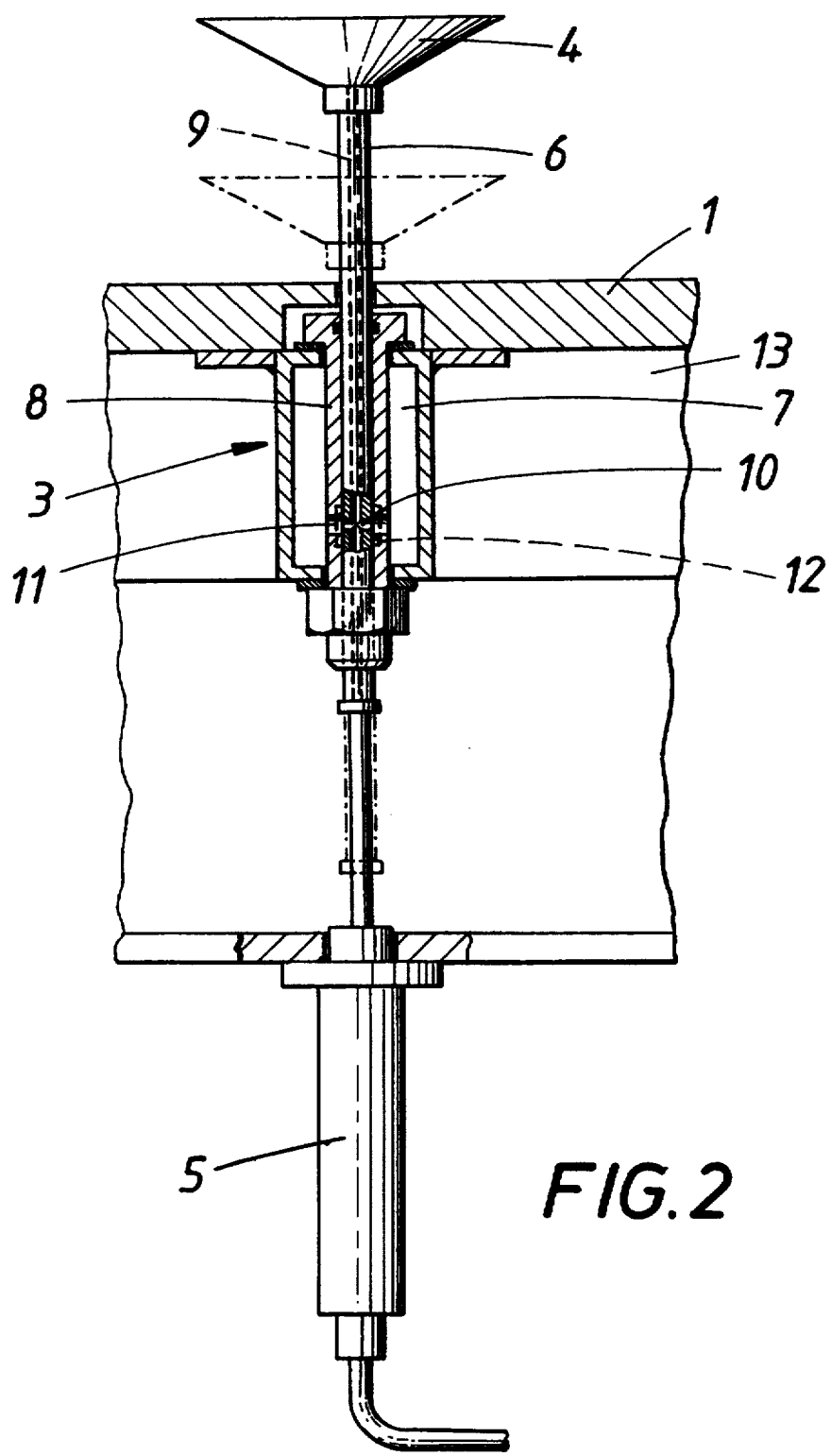
FIG. 2 is an enlarged vertical sectional view showing a vacuum aspirator of that work-supporting deck.

As is indicated by dash lines in FIG. 2 the transverse bore 11 of the bushing 8 may open into an annular groove 12 formed in the inside surface of the bushing 8. That annular groove 12 defines an elevation range, within which the active position of the associated suction cup 4 can be selected while an application of the vacuum is ensured. In that case the elevations of the suction cups can be adjusted in adaptation to a curved bottom surface of a workpiece. An excessive loss of the vacuum at a suction cup which does not engage the workpiece can be prevented if the cross-sections of the bores and lines are rather small or said bores and lines are formed with constrictions so that the application of a sufficient vacuum and a satisfactory operation will be ensured, provided that a sufficiently powerful vacuum pump is used.

As a separate vacuum chamber or a separate vacuum line is not required for each vacuum aspirator 3, a common vacuum chamber 7 is provided for the aspirators of each row thereof. Said vacuum chambers are defined by chamber structures, which are mounted in the frame of the deck and also serve as carriers. The vacuum chamber structures are joined at their ends to longitudinal side bars 13 of the frame of the deck and said side bars 13 contain vacuum lines, by which the vacuum source, not shown is connected to the vacuum chambers 7.

The supporting surface 2 of the work-supporting deck 1 is suitably divided into, e.g., two sections 2a, 2b and the aspirators 3 of each of said sections 2a and 2b are adapted to be connected to a common vacuum source. In that case a vacuum can be applied to the aspirators of one section independently of the aspirators of the other section so that one section can be used to retain workpieces as they are processed whereas workpieces can be placed on or removed from the other idle section at the same time.

To permit an adaptation of the work-supporting surface 2 to different workpieces, it will be desirable to provide at least in one region 2c of the supporting surface 2 a group of aspirators 3 having a different pitch, preferably a smaller pitch, so that particularly smaller workpieces can reliably be supported in that region.

To permit an adjustment of the aspirators 3 in adaptation to workpieces having different shapes and sizes, the aspirators or their suction cups may be laterally adjustable, e.g., by a lateral adjustment of the vacuum chamber structures defining the vacuum chambers 7 if they are slidably mounted on the side bars 13 by carriages 14.

Figure 3:
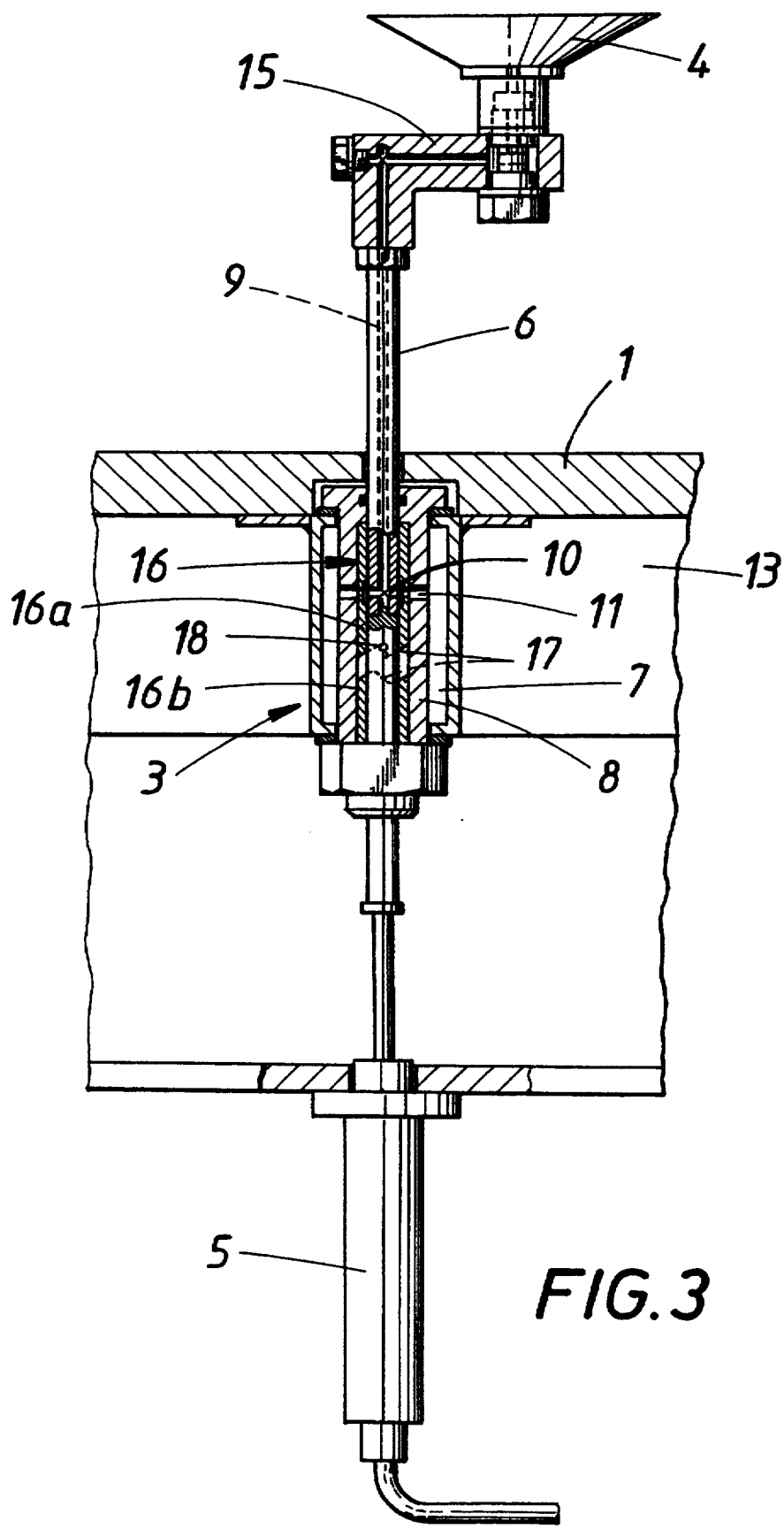
FIG. 3 is a vertical sectional view showing another illustrative embodiment of a vacuum aspirator.

In a particularly desirable arrangement, which may be used for that purpose and is shown in FIG. 3, each vacuum aspirator 3 comprises an eccentrically mounted suction cup 4, which is rotationally adjustable. The suction cup 4 is mounted in an eccentric head 15 of the lifting ram 6, which cooperates with two cam sleeves 16a, 16b, which are generally designated 16 and are fixed in the bushing 8 and having confronting end faces, which constitute cam faces 17 defining a cam slot. The lifting ram 6 is provided with a laterally protruding cam follower pin 18, which extends into said cam slot and cooperates with the cam faces 17 so that the lifting ram 6 will be rotated as it is moved up and down. As a result, the lifting ram 6 can be raised and lowered several times by the actuator 5 so that the lifting ram 6 and the suction cup 4 will be rotated about the axis of the lifting ram 6 to move the suction cup 4 to a desired position on its orbit. Whereas the cam faces 17 may be designed to define different elevations of the lifting ram, such an adjustment in elevation will usually not be desirable unless the suction cup 4 is centered on the lifting ram 6 so that the rotational position and elevation can be selected independently of each other.

Because the actuators 5 for the vacuum aspirators 3 can be individually operated, the work-supporting deck 1 can be adjusted in adaptation to any desired workpiece by a simple program control, which in dependence on the shape and size of the workpiece causes only those aspirators 3 to be activated which are disposed entirely within the contour of the workpiece. As said aspirators 3 are raised, the workpiece is snugly supported on a large area, with the exception of a small margin, which is left free for being processed. That practice will permit a processing with a high quality and a favorable utilization of the tools. Because the raising of the aspirators will automatically move the suction cups to their active positions, in which a vacuum is applied, the workpiece will automatically be supported and retained as the aspirators are raised so that an economical operation will be ensured. As the aspirators are lowered, the workpiece will be relieved from the vacuum and can then easily be removed or replaced. Because simple design features will permit different active positions to be assumed by the vacuum cups within a certain elevation range, it will be possible to automatically support even curved or stepped or other shaped workpieces because aspirators disposed near the edges of the workpiece and the inner aspirators can subsequently be raised until they engage the bottom surface of the workpiece and can thus be adapted to the shape of the workpiece.

Figure 4:
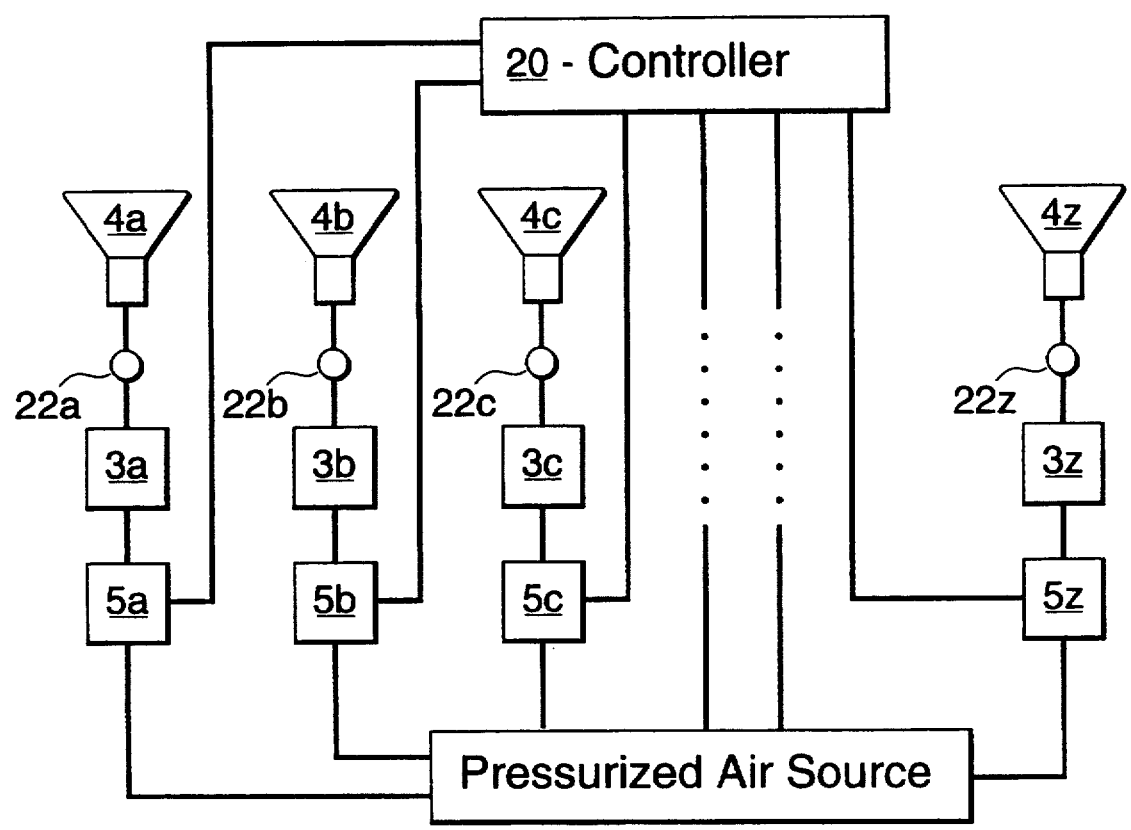
FIG. 4 is a schematic showing a controller connected to the individual vacuum pod valves.
Figure 5:
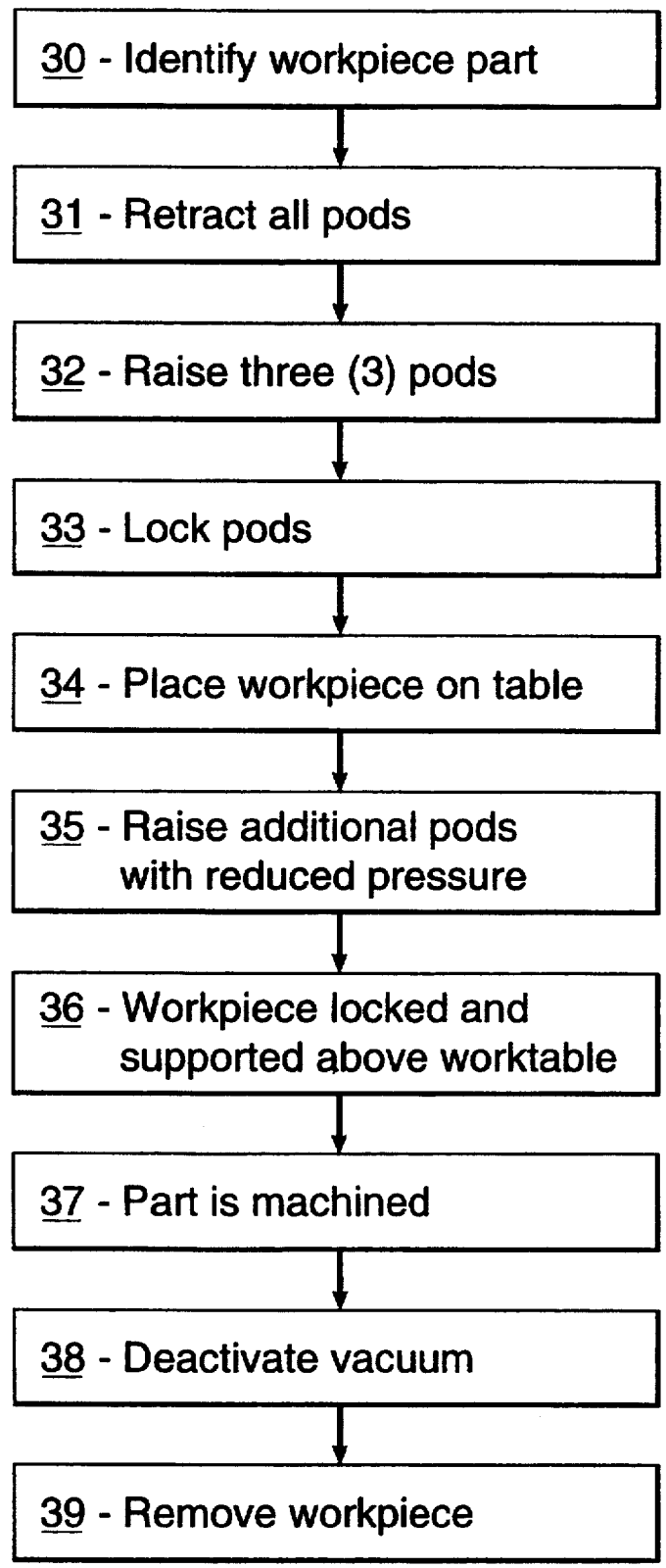
FIG. 5 is a flow chart representing the basic sequence of operations undergone by the work-supporting deck.

In order to support the non-flat workpiece, the work-supporting deck includes means for raising at least three suction cups to one of the active upper positions, the uppermost position, for example, to support the workpiece and subsequently raising additional suction cups into contact with the workpiece. The additional suction cups are raised in at least two groups, so that the additional suction cups are coupled with the vacuum source in stages to maintain a predetermined vacuum level. By raising the suction cups in stages, the danger of a sudden collapse of the vacuum is avoided. The suction cups are raised by a controller 20 that is coupled to the actuators, as can be seen in FIG. 4. The controller raises the at least three suction cups with a first predetermined force level and then releasably locks them in the uppermost position. The workpiece is then supported by the at least three suction cups with the additional suction cups being raised with a second predetermined force level that is less than the first predetermined force level. The additional suction cups are raised until they automatically contact the workpiece surface. Vacuum cups 4 are made from an elastic material and/or are connected to lifting ram 6 with a universal joint 22 so that vacuum cup 4 can conform to the workpiece surface regardless of the shape of the workpiece. The controller selects the at least three suction cups and the additional suction cups as those being wholly within the perimeter of the workpiece. A method for supporting a workpiece with vertically-movable suction cups for machining includes the steps of raising three suction cups to their uppermost position and locking them in place. The workpiece is then places on the three raised suction cups and additional suction cups that are below the workpiece are raised until they contact the workpiece. The workpiece is machined, the additional suction cups are lowered, and the workpiece is removed. FIG. 5 is a flow chart showing these basic steps 30–39.

I claim:

1. A work-supporting deck for use in a machine tool, which comprises:
   (a) a multiplicity of vacuum aspirators constituting a work-supporting surface and operable to support and retain a workpiece on said surface, the vacuum aspirators being arranged in a plurality of rows and a plurality of columns wherein at least part of said aspirators are regularly spaced apart, each of said aspirators comprising
      (1) a lifting ram formed with an axial suction bore and
      (2) a suction cup carried on top of the lifting ram and communicating with the suction bore,
   (b) a multiplicity of actuators operatively connected to respective ones of said suction cups and individually operable to move the associated vacuum cup between an inactive lower position and at least one active upper position,
   (c) means defining at least one vacuum chamber adapted to be connected to a vacuum source,
   (d) a plurality of vertical bushings mounted to extend in said at least one vacuum chamber, each one of the bushings being formed with a transverse through bore,
      (1) each one of the lifting rams being vertically slidably fitted in an associated one of the bushings and being formed with a transverse port adapted to communicate with said transverse through bore whereby each lifting ram and associated busing constitutes a sliding valve controlling the communication of the axial suction bore in the lifting ram with the vacuum chamber, and
   (e) means for raising at least three suction cups to one of said at least one active upper positions to support the workpiece and subsequently raising additional suction cups into contact with the workpiece.

2. The work-supporting deck of claim 1, wherein the aspirators are arranged in at least two groups of rows, the spacing of the aspirators in the rows of one of the groups differing from that of the other group.

3. The work-supporting deck of claim 1, wherein the aspirators are arranged in at least two groups constituting different sections of the work-supporting surface, the aspirators of each one of the groups being connected to an associated one of the vacuum chambers.

4. The work-supporting deck of claim 1, wherein said means for raising includes raising the additional suction cups in at least two groups, so that the additional suction cups are coupled with the vacuum source in stages to maintain a predetermined vacuum level.

5. The work-supporting deck of claim 4, wherein one of said at least one active upper positions that is farthest from said inactive lower position is an uppermost position.

6. The work-supporting deck of claim 5, wherein said means for raising comprises:
   a controller coupled to said multiplicity of actuators for raising said at least three suction cups to said uppermost position.

7. The work-supporting deck of claim 6, wherein said controller raises said at least three suction cups with a first predetermined force level.

8. The work-supporting deck of claim 7, further comprising means for releasably locking said at least three suction cups in said uppermost position.

9. The work-supporting deck of claim 8, wherein said controller raises said additional suction cups with a second predetermined force level that is less than said first predetermined force level.

10. The work-supporting deck of claim 9, wherein said controller selects said at least three suction cups and said additional suction cups as suction cups located within a perimeter of the workpiece.

11. The work-supporting deck of claim 10, wherein said second predetermined force level raises said additional suction cups so that their respective upper positions conform to a contour of the workpiece.

12. The work-supporting deck of claim 11, further comprising a multiplicity of universal joints operatively coupled between respective ones of said lifting rams and said suction cups so that said suction cups are pivotable to securely attached to the workpiece.

13. The work-supporting deck set forth in claim 1, wherein each of said bushings is formed on its inside surface with an annular groove, which communicates with and is wider than said transverse bore of said bushing and defines for said lifting ram a range of elevations in which said port communicates with said transverse through bore of said bushing.

14. The work-supporting deck set forth in claim 1, wherein
   each of said lifting rams is rotatably mounted in the associated bushing and
   each of said suction cups is eccentrically mounted on the associated lifting ram.

15. The work-supporting deck set forth in claim 14, wherein
   each of said bushings is formed in its inside surface with an annular cam groove defined by upper and lower cam faces and
   each of said lifting rams carries a laterally protruding cam follower pin, which is fixed to said lifting ram and extends into said groove and is arranged to cooperate with said cam faces as said lifting ram is raised and lowered.

16. The work-supporting deck set forth in claim 15, wherein
   said inside surface of said bore is constituted by two sleeves, which have confronting end faces constituting said upper and lower cam faces and defining said cam groove.

17. The work-supporting deck set forth in claim 1, wherein
   each of said lifting rams is rotatably mounted in the associated bushing,
   each of said bushings is formed in its inside surface with an annular cam groove defined by upper and lower cam faces and
   each of said lifting rams carries a laterally protruding cam follower pin, which is fixed to said lifting ram and extends into said groove and is arranged to cooperate with said cam faces as said lifting ram is raised and lowered.

18. The improvement set forth in claim 12, wherein
   said inside surface of said bore is constituted by two sleeves, which have confronting end faces constituting said upper and lower cam faces and defining said cam groove.

19. The work-supporting deck as set forth in claim 1, wherein
   said deck comprises a frame, and
   said vacuum aspirators are laterally adjustably mounted in said frame.

20. The work-supporting deck set forth in claim 1, wherein
   said deck is provided with means for connecting each of said suction cups to a vacuum source when, and only when, it is in the active upper position.

* * * * *